United States Patent
Cheng et al.

(10) Patent No.: US 8,971,161 B2
(45) Date of Patent: Mar. 3, 2015

(54) DEVICES INCLUDING AT LEAST ONE ADHESION LAYER AND METHODS OF FORMING ADHESION LAYERS

(71) Applicant: Seagate Technology LLC, Cupertino, CA (US)

(72) Inventors: Yuhang Cheng, Edina, MN (US); Tong Zhao, Eden Prairie, MN (US); Michael C. Kautzky, Eagan, MN (US); Ed F. Rejda, Bloomington, MN (US); Kurt W. Wierman, Eden Prairie, MN (US); Scott Franzen, Savage, MN (US); Andrew J. Boyne, Minneapolis, MN (US); Michael Allen Seigler, Eden Prairie, MN (US); Sethuraman Jayashankar, Excelsior, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/313,574

(22) Filed: Jun. 24, 2014

(65) Prior Publication Data

US 2014/0376349 A1    Dec. 25, 2014

Related U.S. Application Data

(60) Provisional application No. 61/838,394, filed on Jun. 24, 2013, provisional application No. 61/984,915, filed on Apr. 28, 2014.

(51) Int. Cl.
*G11B 11/00* (2006.01)
*G11B 5/84* (2006.01)
(Continued)

(52) U.S. Cl.
CPC ............ *G11B 5/84* (2013.01); *G11B 5/4866* (2013.01); *B05D 1/36* (2013.01); *G11B 5/85* (2013.01); *G11B 5/851* (2013.01); *G11B 5/858* (2013.01); *G11B 2005/0021* (2013.01)
USPC ........................................................ 369/13.33

(58) Field of Classification Search
None
See application file for complete search history.

(56) References Cited

U.S. PATENT DOCUMENTS 6,144,098 A   11/2000  Iyer
8,040,761 B2  10/2011  Kawamori
(Continued)

FOREIGN PATENT DOCUMENTS

EP    0 580 368 A2    1/1994
WO    WO 2013/163195   10/2013
WO    WO 2013/163470   10/2013

OTHER PUBLICATIONS

U.S. Appl. No. 13/923,925, filed Jun. 21, 2013, Pitcher.
(Continued)

*Primary Examiner* — Thang Tran
(74) *Attorney, Agent, or Firm* — Mueting, Raasch & Gebhardt, P.A.

(57) ABSTRACT

Devices that include a near field transducer (NFT), the NFT having a disc and a peg, and the peg having five surfaces thereof; and at least one adhesion layer positioned on at least one of the five surfaces of the peg, the adhesion layer including one or more of the following: rhenium, osmium, iridium, platinum, hafnium, ruthenium, technetium, rhodium, palladium, beryllium, aluminum, manganese, indium, boron, and combinations thereof beryllium oxide, silicon oxide, iron oxide, zirconium oxide, manganese oxide, cadmium oxide, magnesium oxide, hafnium oxide, and combinations thereof tantalum carbide, uranium carbide, hafnium carbide, zirconium carbide, scandium carbide, manganese carbide, iron carbide, niobium carbide, technetium carbide, rhenium carbide, and combinations thereof chromium nitride, boron nitride, and combinations thereof.

19 Claims, 5 Drawing Sheets

(51) Int. Cl.
*G11B 5/48* (2006.01)
*B05D 1/36* (2006.01)
*G11B 5/85* (2006.01)
*G11B 5/851* (2006.01)
*G11B 5/858* (2006.01)
*G11B 5/00* (2006.01)

(56) References Cited

U.S. PATENT DOCUMENTS

| | | | |
|---|---|---|---|
| 8,343,364 B1 * | 1/2013 | Gao et al. | 216/22 |
| 8,385,158 B1 * | 2/2013 | Hu et al. | 369/13.01 |
| 8,400,902 B2 | 3/2013 | Huang | |
| 8,427,925 B2 * | 4/2013 | Zhao et al. | 369/112.23 |
| 8,773,956 B1 * | 7/2014 | Wang et al. | 369/13.01 |
| 8,787,129 B1 * | 7/2014 | Jin et al. | 369/13.33 |
| 8,790,527 B1 * | 7/2014 | Luo et al. | 216/24 |
| 2010/0104768 A1 * | 4/2010 | Xiao et al. | 427/552 |
| 2010/0123965 A1 * | 5/2010 | Lee et al. | 360/59 |
| 2010/0321814 A1 * | 12/2010 | Zou et al. | 360/59 |
| 2010/0329085 A1 | 12/2010 | Kawamori | |
| 2011/0096431 A1 | 4/2011 | Hellwig | |
| 2013/0279315 A1 * | 10/2013 | Zhao et al. | 369/13.33 |
| 2013/0288077 A1 | 10/2013 | Dhawan | |
| 2013/0330573 A1 * | 12/2013 | Zhao et al. | 428/814 |
| 2014/0004384 A1 | 1/2014 | Zhao | |
| 2014/0251948 A1 * | 9/2014 | Zhao et al. | 216/24 |
| 2014/0307534 A1 * | 10/2014 | Zhou et al. | 369/13.33 |

OTHER PUBLICATIONS

U.S. Appl. No. 14/062,651, filed Oct. 24, 2013, Zou.

Sato et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.

Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

* cited by examiner

DEVICES INCLUDING AT LEAST ONE ADHESION LAYER AND METHODS OF FORMING ADHESION LAYERS

CROSS REFERENCE TO RELATED APPLICATION

This application claims priority to U.S. Provisional Applications No. 61/838,394, entitled ADHESION LAYER FOR NEAR FIELD TRANSDUCERS AND STRUCTURES CONTAINING THE SAME, filed on Jun. 24, 2013, and 61/984,915 entitled METHODS OF FORMING NEAR FIELD TRANSDUCERS (NFTS) USING ION IMPLANTATION, filed on Apr. 28, 2014, the disclosures of which are incorporated herein by reference thereto.

SUMMARY

Disclosed are devices that include a near field transducer (NFT), the NFT having a disc and a peg, and the peg having five surfaces thereof; and at least one adhesion layer positioned on at least one of the five surfaces of the peg, the adhesion layer including one or more of the following: rhenium (Re), osmium (Os), iridium (Ir), platinum (Pt), ruthenium (Ru), technetium (Tc), rhodium (Rh), palladium (Pd), beryllium (Be), aluminum (Al), manganese (Mn), indium (In), boron (B), and combinations thereof; beryllium oxide (BeO), silicon oxide (SiO), iron oxide (FeO), zirconium oxide (ZrO), manganese oxide (MnO), cadmium oxide (CdO), magnesium oxide (MgO), hafnium oxide (HfO), and combinations thereof; tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), and combinations thereof; and chromium nitride (CrN), boron nitride (BN), and combinations thereof.

Also disclosed are devices that include an energy source; a near field transducer (NFT) configured to receive energy from the energy source, the NFT having a disc and a peg, and the peg having five surfaces thereof; and at least one adhesion layer positioned on at least one of the five surfaces of the peg, the adhesion layer including one or more of the following: rhenium (Re), osmium (Os), iridium (Ir), platinum (Pt), ruthenium (Ru), technetium (Tc), rhodium (Rh), palladium (Pd), beryllium (Be), aluminum (Al), manganese (Mn), indium (In), boron (B), and combinations thereof beryllium oxide (BeO), silicon oxide (SiO), iron oxide (FeO), zirconium oxide (ZrO), manganese oxide (MnO), cadmium oxide (CdO), magnesium oxide (MgO), hafnium oxide (HfO), and combinations thereof; tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), and combinations thereof; and chromium nitride (CrN), boron nitride (BN), and combinations thereof.

Also disclosed are devices that include a waveguide, the waveguide having a core; a write pole; and a near field transducer (NFT) configured to receive energy from the energy source, the NFT having a disc and a peg, and the peg having five surfaces thereof; and at least one adhesion layer positioned on at least one of the five surfaces of the peg, the adhesion layer including one or more of the following: rhenium (Re), osmium (Os), iridium (Ir), platinum (Pt), ruthenium (Ru), technetium (Tc), rhodium (Rh), palladium (Pd), beryllium (Be), aluminum (Al), manganese (Mn), indium (In), boron (B), and combinations thereof; beryllium oxide (BeO), silicon oxide (SiO), iron oxide (FeO), zirconium oxide (ZrO), manganese oxide (MnO), cadmium oxide (CdO), magnesium oxide (MgO), hafnium oxide (HfO), and combinations thereof; tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), and combinations thereof; and chromium nitride (CrN), boron nitride (BN), and combinations thereof, the NFT positioned between the write pole and the waveguide.

Also disclosed are methods of forming a near field transducer (NFT), the method including forming a dielectric layer on a substrate; implanting at least one element into the dielectric layer; depositing a NFT material on the implanted dielectric layer; and forming a NFT from the deposited NFT material.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

In some embodiments, a NFT can include a small peg and a large disk. The very high temperatures that the NFT reaches during operation can lead to diffusion of the material of the NFT (for example gold) from the peg and towards the disk. This can lead to deformation and recession of the peg, which can lead to failure of the NFT and the entire head.

Disclosed devices include one or more layers adjacent one or more surfaces of the peg of the NFT to increase or improve adhesion of the peg material to the surrounding materials or structures within the device. If the peg is better adhered to the surrounding materials or structures, it will be less likely to deform and/or recess.

Figure 1:
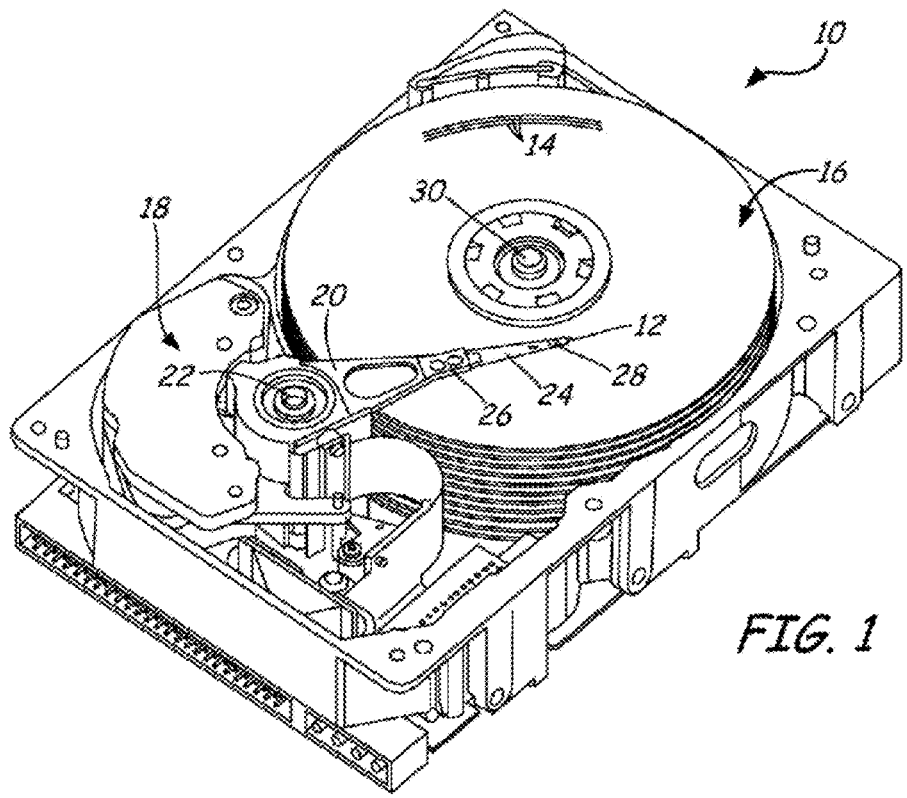
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
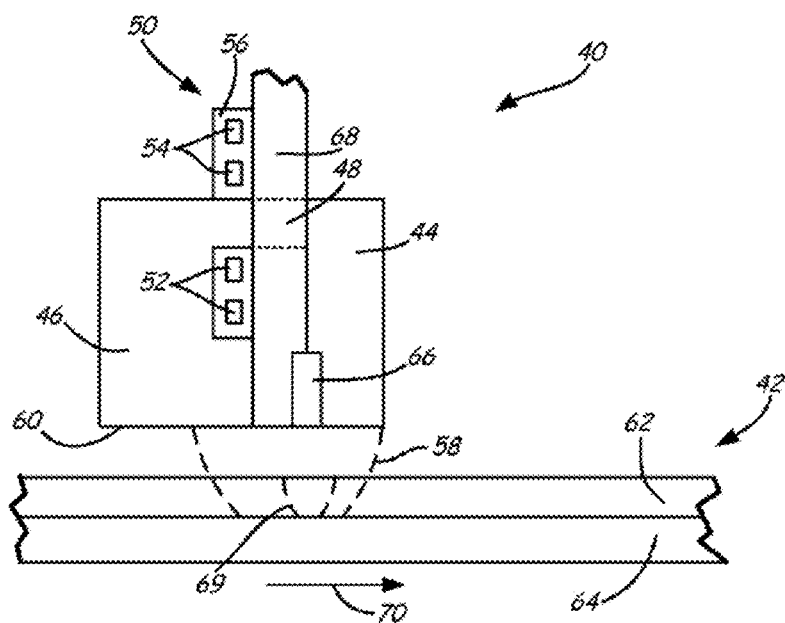
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

Figure 3A:
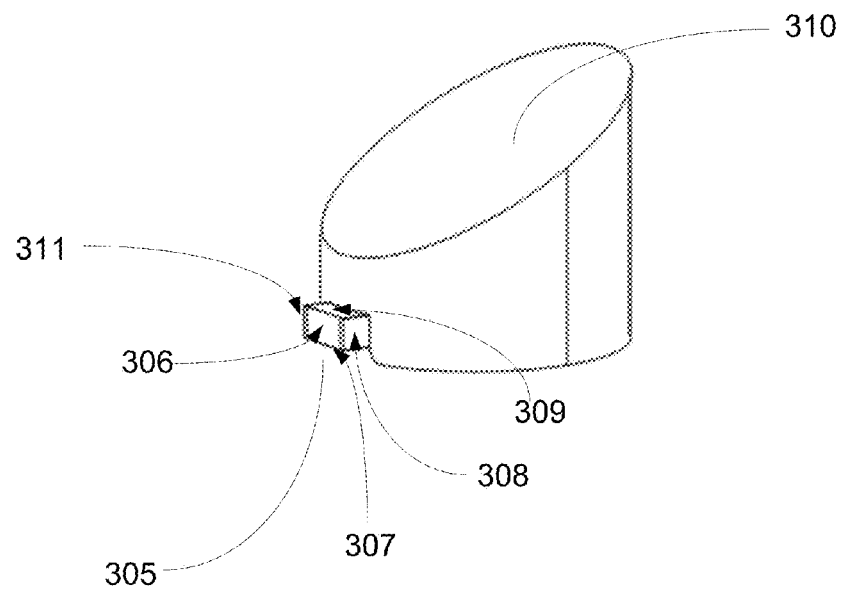
FIGS. 3A and 3B are a perspective views of an illustrative NFT (FIG. 3A) and the peg thereof (FIG. 3B).
Figure 3B:
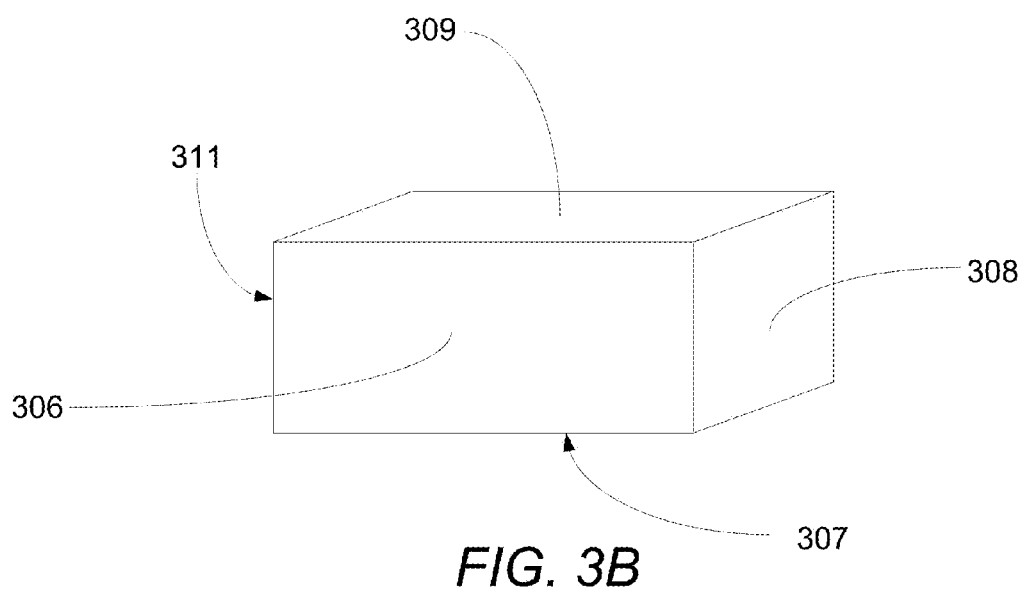

FIGS. 3A and 3B show an example of the peg and disc of a peg and disc type NFT, and FIG. 3B shows a closer view of only the peg of the peg and disc type NFT shown in FIG. 3A. The NFT in FIG. 3A includes a peg 305 and a disc 310. The peg 305 shown in FIGS. 3A and 3B includes five surfaces that are not in contact with the disc 310, an air bearing surface 306, a first surface 307, a second surface 309, a third surface 308, and a fourth surface 311.

In some embodiments, the second surface 309 and the first surface 307 are facing the pole and core respectively. In some embodiments, the third surface 308 and the fourth surface 311 are not facing the pole or the core. More specifically, the third surface 308 would be located in front of the paper on which FIG. 2 is depicted and the fourth surface 311 would be located behind the paper on which FIG. 2 is depicted. In some embodiments, the second surface 309 can also be referred to as the NFT-pole surface which faces a NFT-pole space, which can be referred to as a NPS (not shown herein). In some embodiments, the first surface 307 can also be referred to as the NFT-core surface, which faces a NFT-core space, which can be referred to as CNS (not shown herein). In some embodiments, the third surface 308 can also be described as the surface which faces the left side of a device, in some embodiments; a left solid immersion mirror can be located there. In some embodiments, the fourth surface 311 can also be described as the surface which faces the right side of a device, in some embodiments; a right solid immersion mirror can be located there.

Disclosed devices can include one or more adhesion layers located on one or more surfaces of a NFT. In some embodiments, disclosed devices can include one or more adhesion layers located on one or more surfaces of a peg of a NFT. In some embodiments, disclosed devices can include adhesion layers located on two or more surfaces of a peg of a NFT. In some embodiments, disclosed devices can include adhesion layers located on three or more surfaces of a peg of a NFT. In some embodiments, disclosed devices can include adhesion layers located on four or more surfaces of a peg of a NFT. In some embodiments, disclosed devices can include adhesion layers located on all five surfaces of a peg of a NFT. In some embodiments disclosed devices can include adhesion layers located on each of the first surface 307, the second surface 309, the third surface 308, and the fourth surface 311. Adhesion layers on different surfaces of the peg could have different materials. In some embodiments, the adhesion layer on one or more surfaces could be different in order to reduce the optical penalty.

The material of the adhesion layer can be selected based, at least in part, on properties of the materials that will surround the adhesion layer. For example, the material of the adhesion layer can be selected based, at least in part, on properties of the material of the NFT, for example the peg. In some embodiments, the NFT can be made of gold (Au) or gold containing materials for example.

At operating temperatures (relatively high, for example 400° C. or higher) gold (for example) can de-bond from surrounding surfaces (for example the CNS, the NPS, or the head overcoat (HOC) on the ABS) due to low adhesion strengths between the gold and surrounding materials.

When the peg de-bonds from the surfaces surrounding it, the gold atoms at the peg tend to diffuse toward the disk because of the low melting point of gold and in order to reduce more unfavorable (e.g., larger) surface area/volume ratio of the peg as compared to the disk. When two surfaces (A and B, for example) separate from each other, two new surfaces will replace the A/B interface. The total energy change of separation can then be given by $$\Delta\gamma=(\gamma A+\gamma B)-\gamma\text{Interface}$$

where γA and γB are the surface energy of surfaces A and B respectively, and γInterface is the interface energy of A and B. The larger Δγ is, the better the adhesion of the two materials or surfaces. In order to increase adhesion between two surfaces, for example the NFT material (e.g., gold or gold containing material) and a surrounding material, the surface energy of the surrounding material should be increased and the interface energy of the surrounding material with gold should be decreased.

Interface energy (γInterface) can be described as the excess energy per unit area of a system due to the appearance of the interface. Interface energy originates from the change in the interfacial atomic chemical bonding and the structure/strain at the interface. The interface energy can also be characterized as including the chemical interface energy and the structural interface energy. In some embodiments, reducing the interface energy between the NFT material and an adhesion layer containing a particular material can be accomplished by utilizing materials for the adhesion layer that have similar atomic chemical bonding and atomic radii to the NFT material.

Materials that can be utilized in adhesion layers may have relatively high surface energies and relatively low interface energies with gold (for example). Illustrative materials that can be utilized in adhesion layers can include, for example metals, oxides, nitrides, or carbides that have relatively high surface energies and relatively low interface energies with gold (for example).

In some embodiments, adhesion layers (located on one or more surfaces of a NFT, for example a peg of a NFT) can include one or more metals. In some embodiments, the metal can include specific illustrative metals such as for example rhenium (Re), osmium (Os), iridium (Ir), platinum (Pt), ruthenium (Ru), technetium (Tc), rhodium (Rh), palladium (Pd), beryllium (Be), aluminum (Al), manganese (Mn), indium (In), boron (B), or combinations thereof. In some embodiments, the metal can include specific illustrative metals such as for example Pt, Ir, Al, Rh, Ru, Pd, or combinations thereof. In some embodiments, the metal can include specific illustrative metals such as for example Pt, Ir, Al, or combinations thereof. In some embodiments, the metal can include specific illustrative metals such as for example Pt. In some embodiments, the metal can include specific illustrative metals such as for example Ir. In some embodiments, the metal can include a metal that has a relatively high resistance to oxidation so that the adhesion layer is not oxidized during use of the NFT. In some such embodiments, the metal can include specific illustrative metals such as for example Ir, Pt, Pd, Ru, Rh, Re, Nb, Os, Al, B, or combinations thereof.

In some embodiments, adhesion layers (located on one or more surfaces of a NFT, for example a peg of a NFT) can include one or more metals. In some embodiments, the metal can include specific illustrative metals such as for example tungsten (W), molybdenum (Mo), chromium (Cr), silicon (Si), nickel (Ni), tantalum (Ta), titanium (Ti), yttrium (Y), vanadium (V), magnesium (Mg), cobalt (Co), tin (Sn), niobium (Nb), hafnium (Hf), or combinations thereof. In some embodiments, the metal can include specific illustrative metals such as for example Cr, Ni, Sn, or combinations thereof. In some embodiments, the metal can include specific illustrative metals such as for example Cr, Sn, or combinations thereof. In some embodiments, the metal can include a metal that has a relatively high resistance to oxidation so that the adhesion layer is not oxidized during use of the NFT. In some such embodiments, the metal can include specific illustrative metals such as for example W, Ti, Cr, Si, Ni, or combinations thereof.

In some embodiments, adhesion layers (located on one or more surfaces of a NFT, for example a peg of a NFT) can include one or more metals. In some embodiments, the metal can include specific illustrative metals such as for example Re, Os, Ir, Pt, Hf, Ta, Ru, Tc, Nb, Rh, Pd, Be, Al, Mn, In, W, Mo, Cr, Si, Ni, Ti, Y, V, Mg, Co, Sn, or combinations thereof. In some such embodiments, the metal can include specific illustrative metals such as for example Ir, Pt, Pd, Nb, Ru, Re, Ta, Os, Al, B, W, Ti, Cr, Si, Ni, or combinations thereof. In some embodiments, the metal can include specific illustrative metals such as for example Pt, Ir, Al, Cr, Ni, Sn, or combinations thereof. In some embodiments, the metal can include specific illustrative metals such as for example Pt, Ir, Cr, Sn, or some combinations thereof. In some embodiments, the metal can include a metal that has a relatively high resistance to oxidation so that the adhesion layer is not oxidized during use of the NFT. In some such embodiments, the metal can include specific illustrative metals such as for example Ir, Pt, Pd, Nb, Ru, Re, Ta, Nb, Os, Al, B, W, Ti, Cr, Si, Ni, or combinations thereof.

Figure 4A:
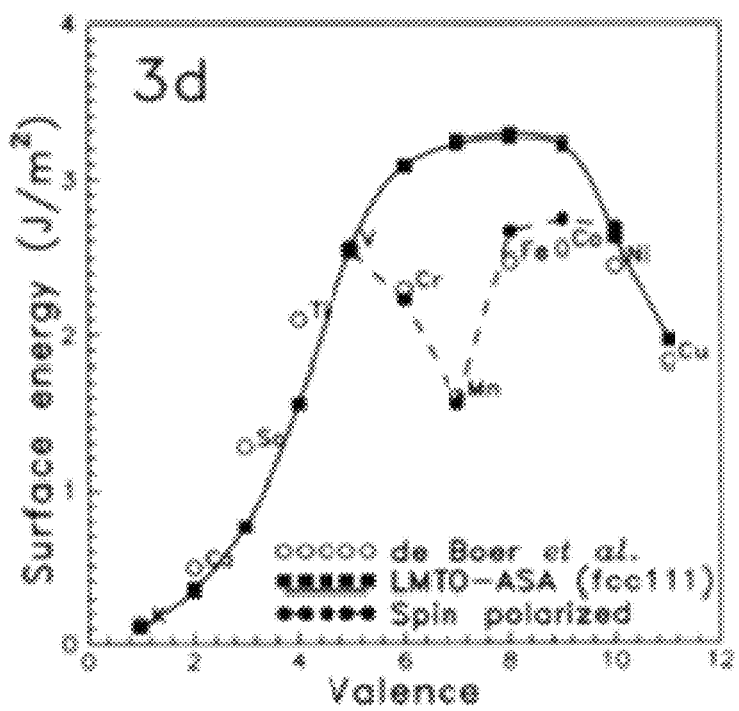
FIGS. 4A to 4D show surface energies of 3d metals (FIG. 4A), 5d metals (FIG. 4B), 4d metals (FIG. 4C), and non-transition metals (FIG. 4D).
Figure 4B:
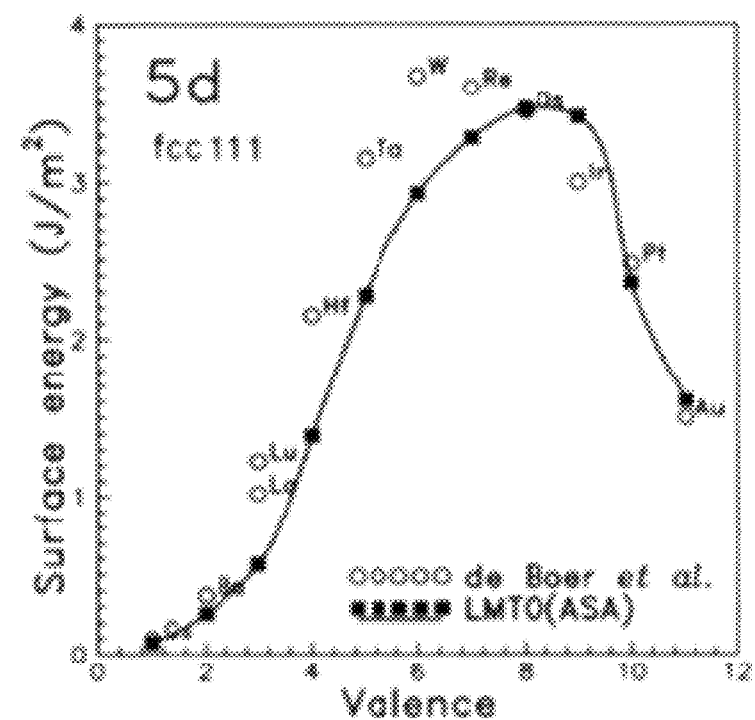
Figure 4C:
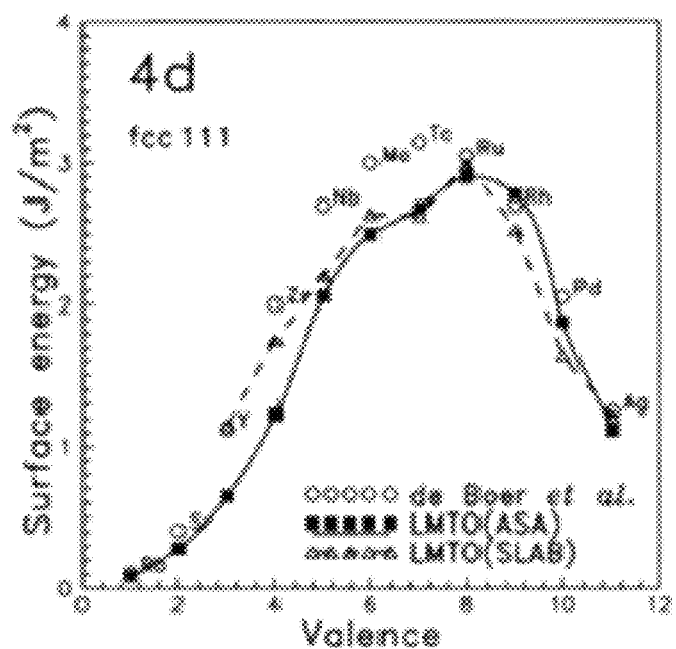
Figure 4D:
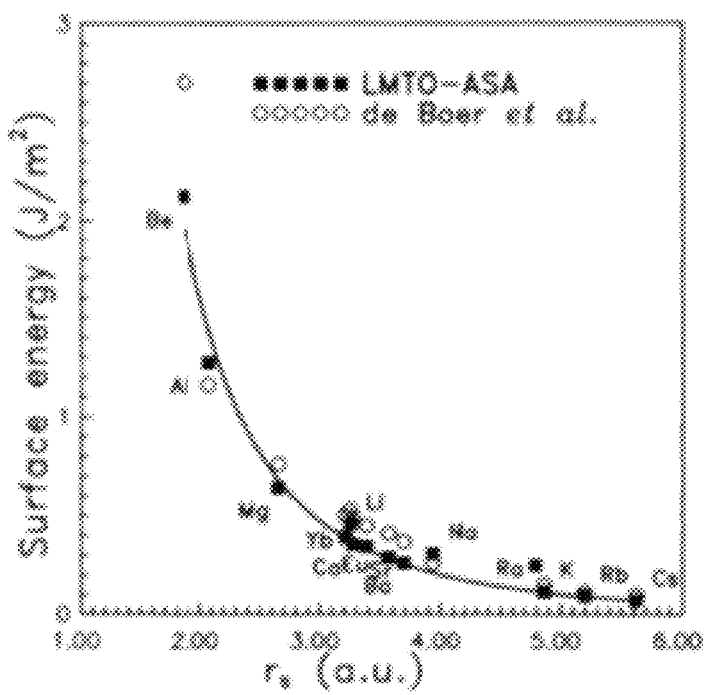

FIG. 4A shows calculated surface energies (J/m$^2$) as a function of valence for the fcc (111) surfaces of the 3d metals in the solid squares; structure-independent surface energies derived from the surface tension of the liquid metals of the 3d metals in the open circles; and the solid line is a guide to the eye while the dashed line connects some of the results. FIG. 4B shows calculated surface energies for the fcc (111) surfaces of the 5d metals in the solids squares; structure-independent surface energies derived from the surface tension of the liquid metals of the 5d metals in the open circles; and the solid line is a guide to the eye. FIG. 4C shows calculated surface energies (J/m$^2$) as a function of valence for the fcc (111) surfaces of the 4d metals in the solid squares; structure-independent surface energies derived from the surface tension of the liquid metals of the 4d metals in the open circles; and the solid line is a guide to the eye while the dashed line connects some of the results. FIG. 4D shows calculated surface energies (J/m$^2$) as a function of valence for the fcc (111) surfaces of the non-transition metals in the solid squares; structure-independent surface energies derived from the surface tension of the liquid metals of the non-transition metals in the open circles; and the solid line is a guide to the eye while the dashed line connects some of the results.

In some embodiments, adhesion layers (located on one or more surfaces of a NFT, for example a peg of a NFT) can include one or more oxides. In some embodiments, the oxide can include specific illustrative oxides such as for example, beryllium oxide (BeO), silicon oxide (SiO), iron oxide (FeO), zirconium oxide (ZrO), manganese oxide (MnO), cadmium oxide (CdO), magnesium oxide (MgO), hafnium oxide (HfO), or some combination thereof. In some embodiments, the oxide can include specific illustrative oxides such as for example, tantalum oxide (TaO), titanium oxide (TiO), tin oxide (SnO), indium oxide (InO), or some combination thereof. In some embodiments, the oxide can include specific illustrative oxides such as for example, beryllium oxide (BeO), silicon oxide (SiO), iron oxide (FeO), aluminum oxide (AlO), titanium oxide (TiO), zirconium oxide (ZrO), tantalum oxide (TaO), manganese oxide (MnO), cadmium oxide (CdO), tin oxide (SnO), indium oxide (InO), indium tin oxide (ITO), or some combination thereof. It should be noted that oxides can include any stoichiometry including the particular noted element and oxygen. For example silicon oxide includes both silicon dioxide ($SiO_2$) and silicon monoxide (SiO).

Table 1 below shows surface energies and transformation energies relative to bulk stable polymorph for several oxides

TABLE 1

| Oxide | Surface Energy ($J/m^2$) | Transformation energy (kJ/mol) |
|---|---|---|
| α-$Al_2O_3$ | 2.6 ± 0.2 | 0 |
| γ-$Al_2O_3$ | 1.7 ± 0.1 | 13.4 ± 2.0 |
| AlOOH (boehmite) | 0.5 ± 0.1 | −17 ± 1 |
| $TiO_2$ (rutile) | 2.2 ± 0.2 | 0 |
| $TiO_2$ (brookite) | 1.0 ± 0.1 | 0.7 ± 0.4 |
| $TiO_2$ (anatase) | 0.4 ± 0.1 | 2.6 ± 0.4 |
| $ZrO_2$ (monoclinic) | 6.5 ± 0.2 | 0 |
| $ZrO_2$ (tetragonal) | 2.1 ± 0.05 | 9.5 ± 0.4 |
| $ZrO_2$ (amorphous) | 0.5 ± 0.05 | 34 ± 4 |
| Zeolitic silicas | 0.09 ± 0.01 | 7-15 |

Table 2 below shows calculated surface energies of (100) face of MO oxides at 0° K.

TABLE 2

| Oxide | Surface Energy ($J/m^2$) |
|---|---|
| MgO | 1.362 |
| MgO | 1.459 |
| CaO | 1.032 |
| BaO | 0.641 |
| MnO | 1.247 |
| CdO | 1.044 |

Table 3 below shows surface energies of MO oxides (crystal system unspecified) at 0° K.

TABLE 3

| Oxide | Surface Energy ($J/m^2$) |
|---|---|
| MgO | 1.090 |
| FeO | 1.060 |
| MnO | 1.010 |
| CaO | 0.820 |
| SrO | 0.700 |
| BaO | 0.605 |
| BeO | >1.420 |
| CdO | 0.530 |
| ZnO | 0.600 |
| PbO | 0.250 |

Table 4 below shows surface energies of $MO_2$ oxides (crystal system unspecified) at 0° K.

TABLE 4

| Oxide | Surface Energy ($J/m^2$) |
|---|---|
| $ZrO_2$ | 0.800 ± 20% |
| $UO_2$ | 0.640 ± 20% |
| $ThO_2$ | 0.530 ± 20% |

In some embodiments, adhesion layers (located on one or more surfaces of a NFT, for example a peg of a NFT) can include one or more carbides. In some embodiments, the carbide can include specific illustrative carbides such as for example, tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), or some combination thereof. In some embodiments, the carbide can include specific illustrative carbides such as for example, vanadium carbide (VC), tungsten carbide (WC), titanium carbide (TiC), chromium carbide (CrC), cobalt carbide (CoC), nickel carbide (NiC), yttrium carbide (YC), molybdenum carbide (MoC), or some combination thereof. In some embodiments, the carbide can include specific illustrative carbides such as for example, vanadium carbide (VC), tantalum carbide (TaC), titanium carbide (TiC), uranium carbide (UC), tungsten carbide (WC), hafnium carbide (HfC), zirconium carbide (ZrC), chromium carbide (CrC), scandium carbide (ScC), manganese carbide (MnC), iron carbide (FeC), cobalt carbide (CoC), nickel carbide (NiC), yttrium carbide (YC), niobium carbide (NbC), molybdenum carbide (MoC), technetium carbide (TcC), rhenium carbide (ReC), or some combination thereof.

Table 5 below shows surface energies of monocarbides (crystal system unspecified) at 1100° C.

TABLE 5

| Carbide | Surface Energy ($J/m^2$) |
|---|---|
| ZrC | 0.80 ± 0.25 |
| UC | 1.0 ± 0.3 |
| TiC | 1.19 ± 0.35 |
| TaC | 1.29 ± 0.39 |
| VC | 1.675 ± 0.5 |

Table 6 below shows surface energies $E_s$ (in both eV/atom and $J/m2$) and theoretical and experimental work functions Φ (in eV) for the 3d, 4d, and 5d transition metal carbides calculated using the linear muffin tin orbital basis atomic sphere approximation (LMTO-ASA) technique.

TABLE 6

| Carbide | $E_S$ [eV] | $E_S[J/m^2]$ | $Φ^{the}$ [eV] | $Φ^{exp}$ [eV] |
|---|---|---|---|---|
| ScC | 0.67 | 1.88 | 4.94 | — |
| TiC | 0.83 | 2.73 | 4.94 | 3.8 |
|  |  |  |  | 4.1 |
| VC | 0.77 | 2.75 | 5.02 | 4.3 |
| CrC | 0.71 | 2.67 | 5.56 | — |
| MnC | 0.70 | 2.74 | 5.76 | — |
| FeC | 0.71 | 2.87 | 5.83 | — |
| CoC | 0.72 | 2.91 | 6.13 | — |
| NiC | 0.45 | 1.83 | 6.06 | — |
| CuC | 0.42 | 1.57 | 5.66 | — |
| YC | 0.65 | 2.01 | 4.10 | — |
| ZrC | 0.86 | 2.66 | 4.45 | — |
| NbC | 0.87 | 2.81 | 4.45 | 4.1 |
| MoC | 0.77 | 2.57 | 5.10 | 3.5 |
| TcC | 0.69 | 2.27 | 5.53 | — |
| RhC | 0.68 | 2.21 | 5.72 | — |
| RuC | 0.69 | 2.24 | 5.98 | — |
| PdC | 0.47 | 1.50 | 6.09 | — |
| AgC | 0.39 | 1.14 | 5.64 | — |
| LaC | 0.70 | 1.94 | 4.64 | — |
| HfC | 0.90 | 2.87 | 4.45 | 4.6 |
| TaC | 0.88 | 2.99 | 4.36 | 4.3 |
| WC | 0.77 | 2.64 | 5.16 | — |
| ReC | 0.66 | 2.14 | 5.63 | — |
| OsC | 0.62 | 1.93 | 5.87 | — |
| IrC | 0.59 | 1.75 | 5.87 | — |
| PtC | 0.49 | 1.41 | 6.28 | — |
| AuC | 0.35 | 0.93 | 5.79 | — |

In some embodiments, adhesion layers (located on one or more surfaces of a NFT, for example a peg of a NFT) can include one or more nitrides. In some embodiments, the nitride can include specific illustrative nitrides such as for example, chromium nitride (CrN), boron nitride (BN), or some combination thereof. In some embodiments, the nitride can include specific illustrative nitrides such as for example, titanium nitride (TiN), zirconium nitride (ZrN), hafnium nitride (HfN), or some combination thereof. In some embodiments, the nitride can include specific illustrative nitrides such as for example, chromium nitride (CrN), boron nitride (BN), titanium nitride (TiN), zirconium nitride (ZrN), hafnium nitride (HfN), or some combination thereof.

Figure 5:
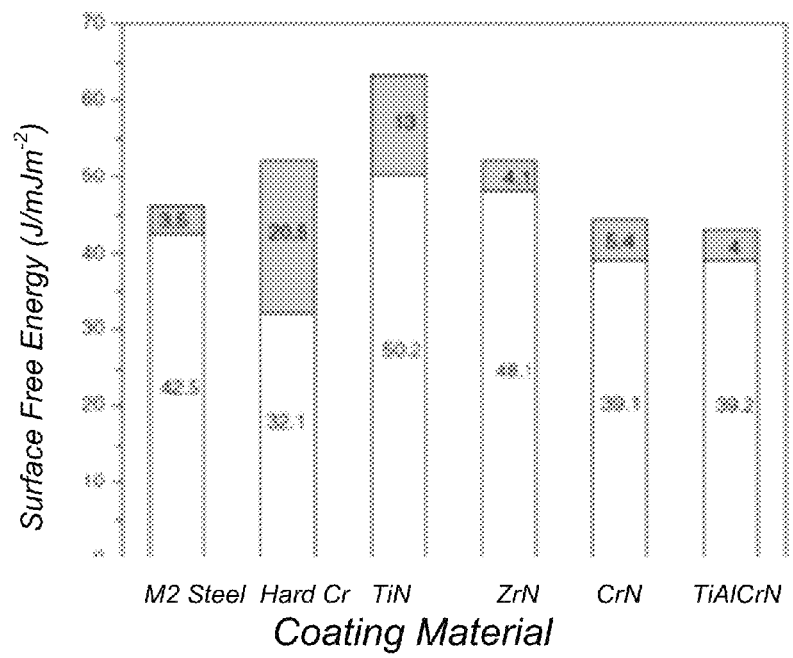
FIG. 5 is a graph showing surface free energies of various nitride coatings at 20° C.

FIG. 5 is a graph showing surface free energies of various coatings at 20° C. The surface free energy is divided into polar (gray mode on top) and dispersion (white mode on bottom) components.

Disclosed adhesion layers can have various thicknesses. The thickness of an adhesion layer can refer to the average thickness of the adhesion layer. In some embodiments, a disclosed adhesion layer can have a thickness that is at least 0.1 nm (1 Å), in some embodiments at least 0.2 nm (2 Å), or in some embodiments at least 1 nm (10 Å). In some embodiments, a disclosed adhesion layer can have a thickness that is not greater than 100 nm (1000 Å), in some embodiments not greater than 40 nm (400 Å), in some embodiments, not greater than 5 nm (50 Å), or in some embodiments not greater than 3.5 nm (35 Å). The thickness (e.g., the average thickness) of an adhesion layer can be measured using, for example, transmission electron microscopy (TEM), X-ray reflectivity (XRR), or x-ray photoelectron spectroscopy (XPS). The thickness can be determined using calibration from standard samples having known thicknesses, for example.

One of skill in the art, having read this specification will understand that NFT types other than peg and disk (also referred to as "lollipop" type NFTs) could be utilized herein. For example plasmonic gap type NFTs and peg only NFTs can also be utilized. In some embodiments, various materials including, for example, gold (Au), silver (Ag), copper (Cu), alloys thereof, or other materials can be utilized to form a NFT. In some embodiments, the NFT can also be made of materials listed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and Ser. No. 14/062,651 entitled RECORDING HEADS INCLUDING NFT AND HEATSINK, filed on Oct. 24, 2013, the disclosures of which are incorporated herein by reference thereto.

In some embodiments, materials that can be utilized for adhesion layers can be those that provide acceptable levels of NFT coupling efficiency loss. Such materials can generally have relatively high indices of refraction (n). The presence of a non-plasmonic material layer, e.g., a disclosed adhesion layer in some embodiments, at the interface of the NFT material and the cladding material layer can "dampen" the ability of that interface to support surface plasmons, which can result in weaker electric field emission from the NFT. Such materials may also have relatively favorable k values. In some embodiments, materials that are more highly detrimental from an optical standpoint can be utilized at relatively smaller thicknesses, for example.

Methods of making devices including disclosed adhesion layers can vary depending on the location of the adhesion layer. In embodiments where one or more adhesion layers are being utilized on the first surface 307, the third surface 308, the fourth surface 311, or any combination thereof, the adhesion layer(s) can be deposited, then the NFT material can be deposited, followed by the cladding or dielectric material. The adhesion layer(s) then affects adhesion between the underlying dielectric material (for example the cladding layers or dielectric layers) and the NFT. In embodiments where an adhesion layer is utilized on the second surface 309, the adhesion layer material can be deposited on the NFT material after it is deposited, for example in a trench (either lined with a disclosed adhesion layer material or not). The adhesion layer on the second surface 309 then affects adhesion between the NFT material and the overlying dielectric material (for example the top cladding layer). In some embodiments, an adhesion layer material can be deposited on a NFT material layer. This structure can then be trimmed in order to form a peg (from the NFT material layer) with an adhesion layer on the first surface 307 of the peg. Next, an adhesion layer can be formed on the third surface 308, the fourth surface 311 and the second surface 309. Excess adhesion layer material can then optionally be removed from the structure.

Illustrative processes for forming disclosed adhesion layers can include for example, deposition methods such as chemical vapor deposition (CVD), physical vapor deposition (PVD), atomic layer deposition (ALD), plating (e.g., electroplating), sputtering methods, cathodic arc deposition methods, ion implantation method and evaporative methods.

Processes to form the adhesion layer could be easily integrated into the overall manufacturing process of the device. Overall, the use of disclosed adhesion layers would decrease or eliminate yield loss due to delamination of the NFT and contribute to increased NFT lifetime during the operation of the magnetic device with very little effect on current formation processes for the device.

In some embodiments, an adhesion layer can be formed using ion implantation. Such methods of forming adhesion layers can include implanting one or more elements into a layer that will ultimately be located immediately below the NFT (which can be made from gold (Au), silver (Ag), copper (Cu), aluminum (Al), rhodium (Rh), rhenium (Re), alloys (binary or ternary for example) thereof, or combinations thereof, for example). In some embodiments, such layers can be dielectric materials. Illustrative dielectric materials can include alumina, yttria, zirconia, titania, niobia, or combinations thereof, for example. For example, an adhesion layer can be formed by implanting one or more elements into the dielectric material that will ultimately form the core to NFT space (CNS). Other portions of a device, which will ultimately be located adjacent other surfaces of the NFT can also be implanted with one or more elements to form disclosed adhesion layers. In some embodiments adhesion layers can be formed by implanting elements into the dielectric material that forms the pole to NFT space (NPS), the dielectric material that forms cladding of an adjacent waveguide, or any combination thereof.

Implanting one or more elements into dielectric material that will ultimately be adjacent the NFT is thought, but not relied upon, to surface modify the dielectric layer thereby providing an improved wettability and metal adhesion to the dielectric. Implantation of one or more elements into adjacent dielectric materials could serve to modify the surface nanotopology so as to influence and change the growth mode of the film from three dimensional islanded growth to planar growth. Alternatively, the implanted ions themselves could be chosen in order to influence the kinetics of a nucleation and growth process being deposited thereon, thereby forming planar, denser NFT films. The elements to implant could be chosen so that they could modify the surface energy of the dielectric surface for deposition. The elements, when having such effects could be considered surfactants ions, catalyst ions, or both for example. The elements to implant could also or alternatively be chosen to poison or block certain sites of nucleation and growth of the NFT layer.

The element or elements to implant, which will in effect be implanted as ions can vary and can be chosen based on considerations mentioned above as well as others. In some embodiments, implanted elements can be metallic elements, inert gasses, halogens, other types of elements, or combinations thereof, for example. Illustrative elements can include aluminum (Al), iron (Fe), silicon (Si), bismuth (Bi), lead (Pb), tin (Sn), cobalt (Co), ruthenium (Ru), nickel (Ni), germanium (Ge), antimony (Sb), arsenic (As), gallium (Ga), sodium (Na), potassium (K), selenium (Se), gold (Au), silver (Ag), copper (Cu), rhodium (Rh), indium (In), tellurium (Te), or combinations thereof, for example. Illustrative elements can include argon (Ar), krypton (Kr), xenon (Xe), neon (Ne), or combinations thereof for example. Illustrative elements can include chlorine (Cl), iodine (I), or combinations thereof for example. Illustrative elements can include oxygen (O), phosphorus (P), carbon (C), nitrogen (N), sulfur (S), or combinations thereof for example. Some illustrative elements, for example inert gasses can also be used for surface bombardment, nanotopolgy creation, or combinations thereof for example. As discussed above, the particular element or elements chosen can be chosen, based at least in part, to improve film density, change local surface wetting angles advantageously, encourage two dimensional planar growth, advantageously alter the sticking coefficient of the NFT layer (e.g., metal layer) to the dielectric layer, act as selective catalysts or preferred sites for the growth of the NFT material, promote uniform nucleation, improve interfacial strength, high temperature stability, or combinations thereof. In some embodiments where the NFT material will include gold (Au), the dielectric material, e.g., the CNS, can be implanted with Au ions.

In some embodiments more than one element can be implanted into the dielectric material in order to modify the surface upon with the NFT material will be deposited. In some embodiments, the at least two species may react with each other, they may react with the dielectric material surface, they may react with the NFT material while it is being deposited or once it is deposited, or some combination thereof. The reaction of the one or more elements may serve to improve the density of the NFT material deposited, improve the interfacial strength, or some combination thereof.

The concentration of implanted element(s) can vary and need not be the same across the implantation surface or into the implantation surface. In some embodiments, the concentration of the implanted element(s) can be advantageously modified in the vicinity of the NFT growth surface. In some embodiments, the elements can have a concentration profile into the dielectric material. In some embodiments, the concentration profile of the implanted element(s) can be tailored so as to cause a graded composition profile in the dielectric material. In some embodiments, graded compositions can be advantageously used to modify the stress state in the film and the overall device. In some embodiments, the concentration of the element(s) can be not less than 10 ppm (0.001 atomic percent or at %), or in some embodiments not less than 100 ppm (0.01 at %). In some embodiments, the concentration of the element(s) can be not greater than 10 at %, in some embodiments not greater than 5 at %, or in some embodiments not greater than 2 at %.

The energy of the implanted element(s) or ion(s) as they would be implanted will control the penetration depth of the element into the dielectric material. Sub surface penetration of the species into the first few nanometers (nm) of the dielectric layer (e.g., the CNS) may serve to anchor a NFT layer formed thereon, thereby improving the interfacial strength and robustness.

The at least one element can be implanted into the dielectric material using various types of systems. In some embodiments beam line implants can be utilized, while in some embodiments plasma immersion implants can be utilized. In embodiments where a beam line implant is utilized, the ion beam can be positioned at an angle normal (90 degrees) to the sample surface, or it can be incident at an angle ranging from 1 degree to 90 degrees, for example. The sample can be stationary during the implantation or it can be rotated at a fixed or variable rate of speed during the implant. Implantation (and other optional steps) can be carried out on planar surfaces, on sloped or contoured surfaces, on surfaces with retrograde wall angles, or any combination thereof.

In some embodiments, implantation of one or more elements into a dielectric material may optionally be combined with other treatments of the dielectric material prior to deposition of a NFT material. In some embodiments, such other optional processes can include, thermal treatments (e.g., annealing), chemical treatments, gaseous treatments, or some combination thereof. In some embodiments, implantation of one or more elements may be interspersed with such other optional treatments. In some embodiments, implantation of one or more elements into a dielectric material may optionally be combined with one or more etching steps prior to deposition of the NFT material. Such optional etch steps may be performed after an ion implantation step in order to truncate the dielectric surface where the Rp value is the highest (Rp or the projected range is the average distance a group of implanted ions travel into the surface). The optional etching step can be advantageously followed by deposition of the NFT material, deposition of a metal (that is not the NFT material), deposition of a seedlayer, deposition of a dielectric layer, or any combination thereof. In some embodiments, an optional seedlayer material can be ion implanted into the dielectric material. Element(s) implantation steps may also optionally be followed by thermal treatments, UV treatments, heat treatments, chemical treatments, or any combination thereof prior to, during, or both subsequent metal deposition thereon.

In some embodiments, implantation of the dielectric layer can be followed by deposition of a NFT material and formation of at least a portion of a NFT from the deposited NFT material. Formation of at least a portion of a NFT can include formation of at least a peg, for example. Formation of at least a portion of a NFT can include various processes including for example patterning and removal steps. In some embodiments photolithography processes, etching steps, or combinations thereof can be utilized.

In some embodiments, implantation of one or more elements into the dielectric material can be followed by deposition of a partial NFT material layer. The partial NFT material layer can have a thickness that is not less than 0.1 nm and in some embodiments may have a thickness that is not greater than 20 nm. The partial NFT material layer can then be implanted with an element that could serve to advantageously improve the film densification or enhance the interfacial strength of the interface (e.g., the CNS/NFT interface). Such a species may have an affinity for both the NFT material and the dielectric material (e.g., the CNS). A specific example of such a material could include sulfur (S), which will preferentially bond to metal atoms, such as gold for example. The implantation process and the partial NFT material layer deposition process could be carried out alternatively in repeated sequence so as to create a layered or a graded structure.

Further information can also be found in United States Patent Application entitled "MATERIALS FOR NEAR FIELD TRANSDUCERS AND NEAR FIELD TRANSDUCERS CONTAINING SAME" having attorney docket number 430.18020010, having as inventors Sethuraman Jayashankar and Michael Kautzky, the entire disclosure of which is incorporated herein by reference thereto.

While the present disclosure is not so limited, an appreciation of various aspects of the disclosure will be gained through a discussion of the examples provided below.

EXAMPLES

On the ABS surface of a HAMR head (that included a $SiO_2$ CNS, an Au peg of a NFT, and a $SiO_2$ NPS), a 25 Å thick Ir layer was deposited using magnetron sputtering and on top of that surface, a 20 Å layer of diamond like carbon (DLC) film was deposited using cathodic arc to protect the metal layer from oxidation. For the sake of comparison, a 50 Å layer of tantalum oxide (TaO) was also deposited on samples. Sixty (60) examples of each sample were prepared. The examples were thermally annealed at 400° C. for 1 hour, 3 hours, 6 hours, 12 hours, 24 hours, or 48 hours (given in Table 7 below). Critical dimension scanning electron microscopy (CD-SEM) was then used to evaluate whether or not the peg recessed from the ABS surface. Table 1 shows the samples and their failure rate as a percentage.

Failure rates for the various structures are show in Table 7 below.

TABLE 7

| Layers | Time of Anneal | | | | | | |
|---|---|---|---|---|---|---|---|
| | 20 mins. | 1 hour | 3 hours | 6 hours | 12 hours | 24 hours | 48 hours |
| 50 Å TaO (98.6% failure when annealing at 300° C. for 3 hours) | 100 | 100 | | | | | |
| 25 Å Ir/ 20 Å Cr/ 20 Å DLC | | 0 | 0 | 0 | 0 | 1.82 | 9.09 |

Figures 6A, 6B:
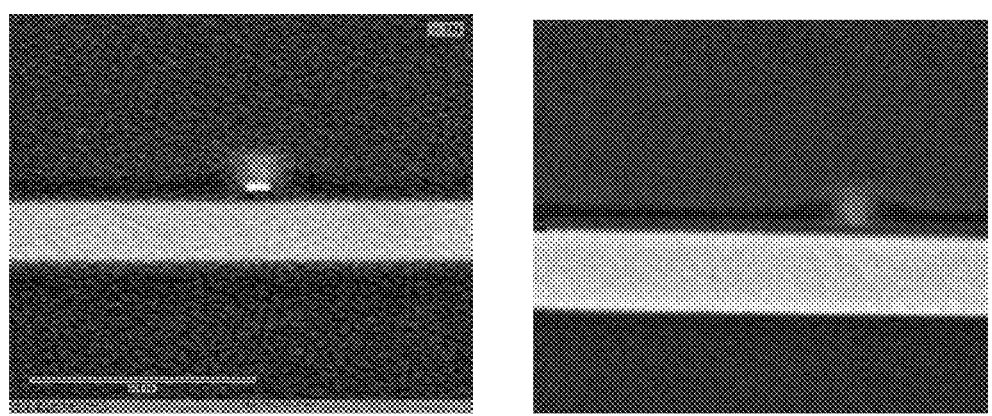
FIGS. 6A and 6B are scanning electron microscope (SEM) images of a sample including a 25 Å Ir adhesion layer (FIG. 6A) and TaO layer for comparison (FIG. 6B), both annealed at 400° C. for 48 hours.

FIG. 6A shows a scanning electron microscope (SEM) image of one of the 25 Å Ir/20 Å Cr/20 Å DLC samples annealed for about 48 hours. FIG. 6B shows a SEM of one of the TaO layers annealed at 300° C. for 3 hours for the sake of comparison.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including at least one adhesion layer and methods of forming adhesion layers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:
1. A device comprising:
a near field transducer (NFT), the NFT having a disc and a peg, and the peg having five surfaces thereof; and
at least one adhesion layer positioned on at least one of the five surfaces of the peg, the adhesion layer comprising one or more of the following:
rhenium (Re), osmium (Os), iridium (Ir), platinum (Pt), ruthenium (Ru), technetium (Tc), rhodium (Rh), palladium (Pd), beryllium (Be), aluminum (Al), manganese (Mn), indium (In), boron (B), and combinations thereof;
beryllium oxide (BeO), silicon oxide (SiO), iron oxide (FeO), zirconium oxide (ZrO), manganese oxide (MnO), cadmium oxide (CdO), magnesium oxide (MgO), hafnium oxide (HfO), and combinations thereof;
tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), and combinations thereof; and
chromium nitride (CrN), boron nitride (BN), and combinations thereof.

2. The device according to claim 1, wherein the NFT comprises gold or an alloy thereof.

3. The device according to claim 1, wherein the at least one adhesion layer is located on a surface of the peg that is along an axis having a core of a waveguide and a write pole.

4. The device according to claim 3, wherein the at least one adhesion layer is located adjacent the core of the waveguide.

5. The device according to claim 3 further comprising at least one additional adhesion layer located on a surface of the peg that is perpendicular to the axis having the core and the write pole.

6. The device according to claim 1, wherein all surfaces of the peg except the air bearing surface have an adhesion layer thereon.

7. The device according to claim 1, wherein all five surfaces of the peg have an adhesion layer thereon.

8. The device according to claim 1, wherein the at least one adhesion layer has a thickness from about 0.1 nm to about 100 nm.

9. The device according to claim 1, wherein the at least one adhesion layer has a thickness from about 0.2 nm to about 5 nm.

10. The device according to claim 1, wherein the at least one adhesion layer comprises Ir, Pt, Pd, Ru, Re, Rh, Os, Al, B, or combinations thereof.

11. The device according to claim 1, wherein the at least one adhesion layer comprises Pt, Ir, Al, or combinations thereof.

12. The device according to claim 1, wherein the at least one adhesion layer comprises Ir.

13. A device comprising:
   an energy source;
   a near field transducer (NFT) configured to receive energy from the energy source, the NFT having a disc and a peg, and the peg having five surfaces thereof; and
   at least one adhesion layer positioned on at least one of the five surfaces of the peg, the adhesion layer comprising one or more of the following:

rhenium (Re), osmium (Os), iridium (Ir), platinum (Pt), ruthenium (Ru), technetium (Tc), rhodium (Rh), palladium (Pd), beryllium (Be), aluminum (Al), manganese (Mn), indium (In), boron (B), and combinations thereof;

beryllium oxide (BeO), silicon oxide (SiO), iron oxide (FeO), zirconium oxide (ZrO), manganese oxide (MnO), cadmium oxide (CdO), magnesium oxide (MgO), hafnium oxide (HfO), and combinations thereof;

tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), and combinations thereof; and chromium nitride (CrN), boron nitride (BN), and combinations thereof.

14. The device according to claim 13, wherein the energy source comprises a laser.

15. The device according to claim 13 further comprising a waveguide, the waveguide configured to receive the energy from the energy source and couple it into the NFT.

16. The device according to claim 15, wherein the at least one adhesion layer is located on a surface of the peg that is along an axis having the core of the waveguide.

17. The device according to claim 16, wherein the at least one adhesion layer is located adjacent the core of the waveguide.

18. The device according to claim 13, wherein all surfaces of the peg except the air bearing surface have an adhesion layer thereon.

19. The device according to claim 13, wherein the at least one adhesion layer comprises Ir, Pt, Pd, Ru, Re, Rh, Os, Al, B, or combinations thereof.

* * * * *